United States Patent [19]
Kowal et al.

[11] Patent Number: 5,710,803
[45] Date of Patent: Jan. 20, 1998

[54] EMERGENCY PHONE MESSAGING SYSTEM

[76] Inventors: Robert Kowal; Donna Kowal, both of HR 1 Box 721, Greenwood Lake, N.Y. 10925

[21] Appl. No.: 713,591

[22] Filed: Sep. 13, 1996

Related U.S. Application Data

[63] Continuation-in-part of Ser. No. 489,752, Jun. 13, 1995, abandoned.

[51] Int. Cl.[6] ............................................. H04M 11/04
[52] U.S. Cl. ........................... 379/41; 379/43; 379/44; 379/51
[58] Field of Search ........................... 379/37–51, 73

[56] References Cited

U.S. PATENT DOCUMENTS

| | | |
|---|---|---|
| 3,553,377 | 1/1971 | Jones . |
| 3,617,640 | 11/1971 | Cichanowicz ............................ 379/40 |
| 3,632,879 | 1/1972 | Freisinger . |
| 4,467,142 | 8/1984 | Rupp et al. . |
| 4,493,947 | 1/1985 | Loveless ................................ 379/40 |
| 4,763,349 | 8/1988 | Siegel et al. ........................... 379/38 |
| 4,993,058 | 2/1991 | McMinn ................................. 379/37 |
| 5,333,172 | 7/1994 | Stevens ................................. 379/38 |

*Primary Examiner*—Wing F. Chan
*Attorney, Agent, or Firm*—David L. Volk

[57] ABSTRACT

A system is provided for automatically dialing and sending out a pre-recorded message in emergency situations to Police, Fire, or Ambulance departments at the push of a single button. The system has separated lighted buttons each for Police, Fire, or Ambulance, with an individual message for each emergency situation. The buttons are color coded and the international symbols for Fire, Police, and Ambulance are embossed on them respectively. The system is capable of storing phone numbers for each emergency service, and has the ability to record and play back a personalized message designed to describe the services needed and the location at which the service is need.

10 Claims, 2 Drawing Sheets

EMERGENCY PHONE MESSAGING SYSTEM

CROSS-REFERENCE TO RELATED APPLICATIONS

This application is a Continuation-In-Part of application Ser. No. 08/489,752, filed Jun. 13, 1995, now abandoned.

BACKGROUND OF THE INVENTION

1. Field of the Invention

The present invention relates generally to telephone messaging and calling systems and, more particularly, to an emergency phone messaging system for transmitting emergency information to signal rescue authorities by utilizing existing telephone lines.

2. Description of the Related Art

The problems associated with requesting response from emergency response personnel such as fireman or police officers are well known in and have been addressed somewhat by the related art. For example, in U.S. Pat. No. 3,553,377 issued in the name of Jones, an emergency selective message sender for a telephone is disclosed. An invention made according to the teachings in Jones would provide for a mechanical means for dialing a rotary phone to "0", or "operator". With a prerecorded emergency message stored on tape, a user would play into the mouthpiece of the phone to the operator the emergency information which the user felt was required. The Jones disclosure appears to address more particularly the problems associated with automatically and/or remotely utilizing a handset, cradle type telephone having a spring based dial. Also, it was envisioned by the Jones disclosure that a smoke detector device and/or a manually triggered button would cause emergency help to be automatically dialed.

Other problems occur from the use of multiple messages. Many different types of emergencies can require many different types of responses from public authorities. An attempt to solve such a problem is disclosed in U.S. Pat. No. 3,632,879 issued in the name of Freisinger et al. In the Freisinger et al. disclosure a pair of emergency activated relays engages an endless loop magnetic tape in a tape cartridge. Having two separate channels, the single loop of tape stores two separate messages, one for fire and one for burglary. A fire detector activates a relay which engages the fire message, and transmits the message over a telephone to emergency response personnel. Similarly, also disclosed is a burglar alarm activating a relay which engages a police message, and transmits the message over a telephone line to the police. A device made according to such a disclosure, however, would be very ineffective without the attached burglar alarm system or fire sensors.

Numerous attempts have been made to correct for the foregoing problems. For instance, U.S. Pat. No. 4,467,142, issued in the name of Rupp et al. discloses a system for transmitting emergency calls from persons requiring assistance. However, a system made in accordance with this reference is associated with several drawbacks. For example, and possibly the most important, such a system requires both the sender and the receiver to have similar, compatible devices in order to receive data properly. Moreover, a 'subscriber line' is envisioned, making such a system only practical with the use of an expensive home protection service that is similarly and currently used for home and small business security systems.

Additionally, U.S. Pat. No. 4,993,058, issued in the name of McMinn et al. addresses the problems associated with use of a system as described in the Rupp et al. disclosure. An invention operating in accordance with the McMinn et al. disclosure activates a lit, flashing house address display upon the user dialing "9-1-1". Such a device is associated with several drawbacks, which include the requirement of the availability of "9-1-1" service in the user's area as well as requiring the user to actually be in a position to dial and contact emergency response personnel.

Finally, also known in the related art is a Radio Shack brand Emergency Dialer System, disclosed in the Radio Shack Catalog, 1995 Edition, Page 142, model number 61-2659. The Radio Shack disclosure comprises essentially a remote pendant engagement means which activates a phone dial. The phone dialer is pre-programmed to dial a number when activated, and can play a recorded message. Such a device is associated with several drawbacks, the most substantial of which is its inability to deliver separately recorded messages to different phone numbers to accommodate various levels of emergencies, such as fire, burglary, or medical.

Consequently, a need has been felt for providing an apparatus and method which allows a user to automatically dial emergency services or to contact the police or fire department without the necessity of an expensive home or business security system.

SUMMARY OF THE INVENTION

It is therefore an object of the present invention to provide an improved emergency phone messaging system.

It is a further object of the present invention to provide an improved emergency phone messaging system which transmits emergency messages recorded under calm and controlled conditions in a clear and consistent manner.

It is a further object of the present invention to provide an improved emergency phone messaging system which allows emergency messages to be sent in a silent manner to prevent discovery and interruption by an intruder or during a robbery.

It is a further object of the present invention to provide an improved emergency phone messaging system which can be easily taught to and used by children.

It is a further object of the present invention to provide an improved emergency phone messaging system in which emergency phone numbers are continuously stored, thereby eliminating the need to look up or possibly misdial such a number.

It is a further object of the present invention to provide an improved emergency phone messaging system which can easily be utilized by those with physical impediments or handicaps.

It is a further object of the present invention to provide an improved emergency phone messaging system which can be utilized by those who cannot adequately communicate in the official language of the area.

It is a further object of the present invention to provide an improved emergency phone messaging system which can transmit emergency information even for those individuals who may be choking or otherwise cannot speak.

It is a further object of the present invention to provide an improved emergency phone messaging system which can allow the user to transmit emergency information automatically, leaving the user free to tend to any emergency situation that may be ongoing.

It is a feature of the present invention to provide an improved emergency phone messaging system which can be utilized in either business or residential situations without requiring an expensive or elaborate security system.

It is a feature of the present invention to provide an improved emergency phone messaging system which uses existing phone technology, including cordless and cellular phone systems.

In accordance with a preferred embodiment, a system is provided for automatically dialing and sending out a prerecorded message in emergency situations to Police, Fire, or Ambulance departments at the push of a single button. The system has separated lighted buttons each for Police, Fire, or Ambulance, with an individual message for each emergency situation. The buttons are color coded and the international symbols for Fire, Police, and Ambulance are embossed on them respectively. The system is capable of storing phone numbers for each emergency service, and has the ability to record and play back a personalized message designed to describe the services needed and the location at which the service is need. Numbers are entered into the system and stored via the use of a 'tone box'. A three position switch is used to permit a different message for each of the three emergency service buttons. Messages are recorded electronically onto a solid state recording means that permits erasure in order to change the messages if needed. The system also has a test switch which permits checking and verifying of the outgoing messages without sending it to emergency personnel.

Once the numbers and messages have been entered into the machine, a user can summon help by pushing a single button. A volume control allows the transmitted message to be heard or silenced. When an emergency service button is pushed, the system will automatically dial the number of that service, and once the phone number being called is answered, an L.E.D. on the system will flash, indicating a connection has been. In the event of a busy signal, the system will continuously redial until a connection is made. The called party can interrupt the message and monitor the situation by pressing the "*" button, which activates a built in microphone. The system will allow all of the emergency buttons to be pushed, and will call those numbers in order.

The system utilizes existing phone technology to transmit the message, and can plug into a standard outlet as a power source. Another embodiment of the present invention allows for batteries to provide the power source, or as a backup to a standard outlet.

Briefly described according to another embodiment of the present invention, an improved emergency phone messaging system is disclosed which provides the same functions as the preferred embodiment for a cordless phone system.

Briefly described according to yet another embodiment of the present provides the same functions as the preferred embodiment, except that a cellular phone system is utilized.

An advantage of the present invention is that it can be utilized by small businesses that do not currently maintain an automatic alarm system.

Among other advantages of the present invention, it can be utilized at a residence to provide a reliable signal for help in a multitude of potentially hazardous situations.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

1. Detailed Description of the Figures

Figure 1:
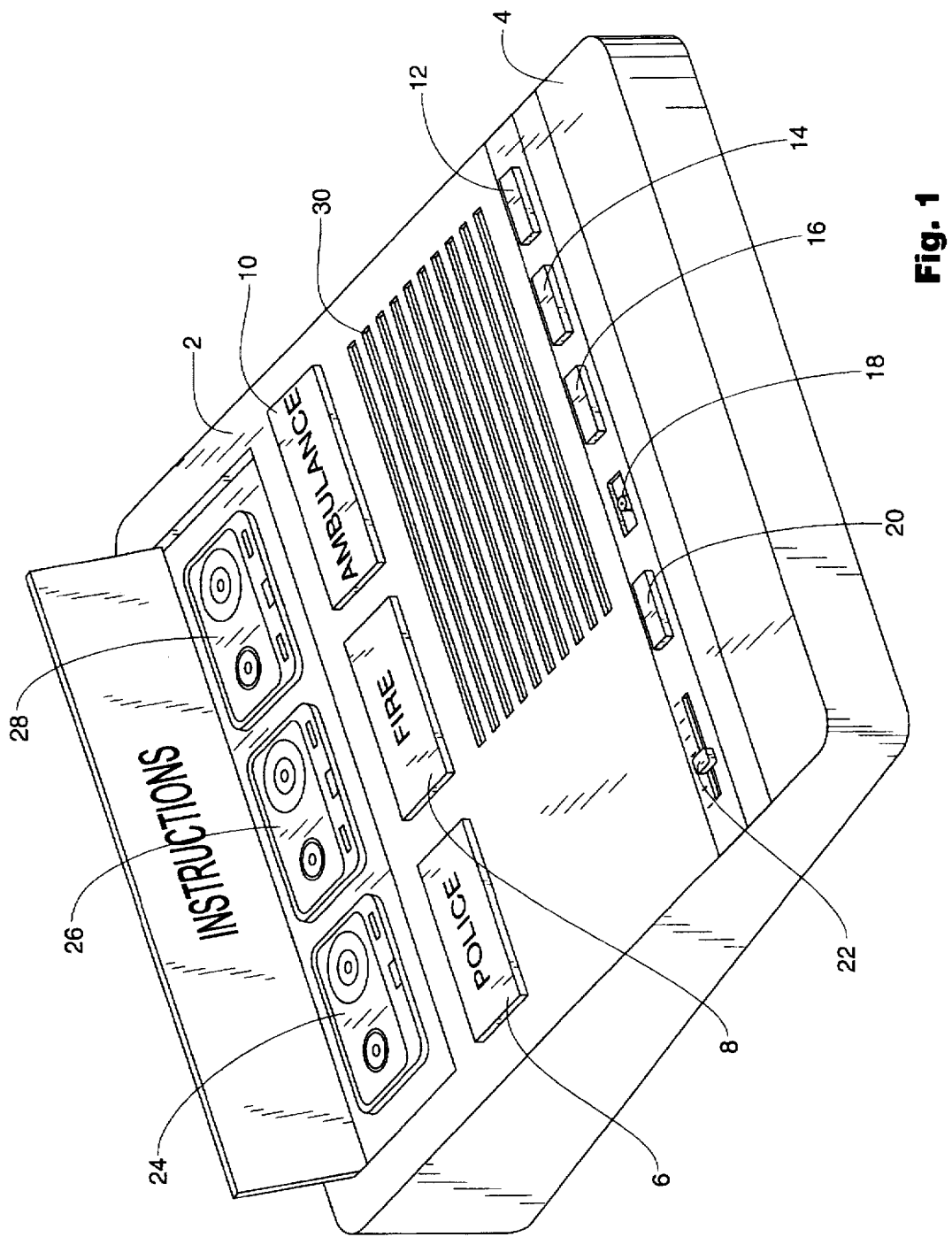
FIG. 1 is an orthographic view of an emergency phone message system according to a preferred embodiment of the present invention.

Referring now to FIG. 1, the emergency phone message system according to the preferred embodiment of the present invention provides generally a housing 2 as shown which contains the electronics and houses the controls, which will be described in greater detail below. The housing 2 is formed on the upper surface by a control panel surface 4. A first emergency activation means 6, second emergency activation means 8, and third emergency activation means 10 are located in an unobstructed manner on the control panel surface 4.

According to the preferred embodiment of the present invention, the first emergency activation means 6 comprises a color coded, lighted button embossed with the international symbol for and the word "Police".

According to the preferred embodiment of the present invention, the second emergency activation means 8 comprises a color coded, lighted button embossed with the international symbol for and the word "Fire".

According to the preferred embodiment of the present invention, the second emergency activation means 10 comprises a color coded, lighted button embossed with the international symbol for and the word "Ambulance".

Also located in an unobstructed manner on the control panel surface 4 is an on/off control means 12, a test engagement means 14, a message selection means 16, a microphone 18, a message recording engagement means 20, and a playback volume control means 22. A first message recording/playback means 24, second message recording/playback means 26, and third message recording/playback means 28 are also provided and accessed from the control panel surface 4.

According to the preferred embodiment of the present invention the first message recording/playback means 24 is comprised of a microcassette recording and playback device. In an alternate embodiment of the present invention, the first message recording/playback means 24 is comprised of a solid state, tapeless, electronic recording device.

According to the preferred embodiment of the present invention the second message recording/playback means 26 is comprised of a microcassette recording and playback device. In an alternate embodiment of the present invention, the second message recording/playback means 26 is comprised of a solid state, tapeless, electronic recording device.

According to the preferred embodiment of the present invention the third message recording/playback means 28 is comprised of a microcassette recording and playback device. In an alternate embodiment of the present invention, the third message recording/playback means 28 is comprised of a solid state, tapeless, electronic recording device.

Finally, located on the control panel surface 4 is a speaker 30, used to audibly communicate information on any recording means under test conditions.

2. Operation of the Preferred Embodiment

In operation, the present invention can be utilized in a variety of ways depending on the various needs and situations of the user. To use the present invention in accordance with its preferred embodiment can best be described in conjunction with the electrical schematic diagram of the logic circuitry as shown in FIG. 2.

Figure 2:
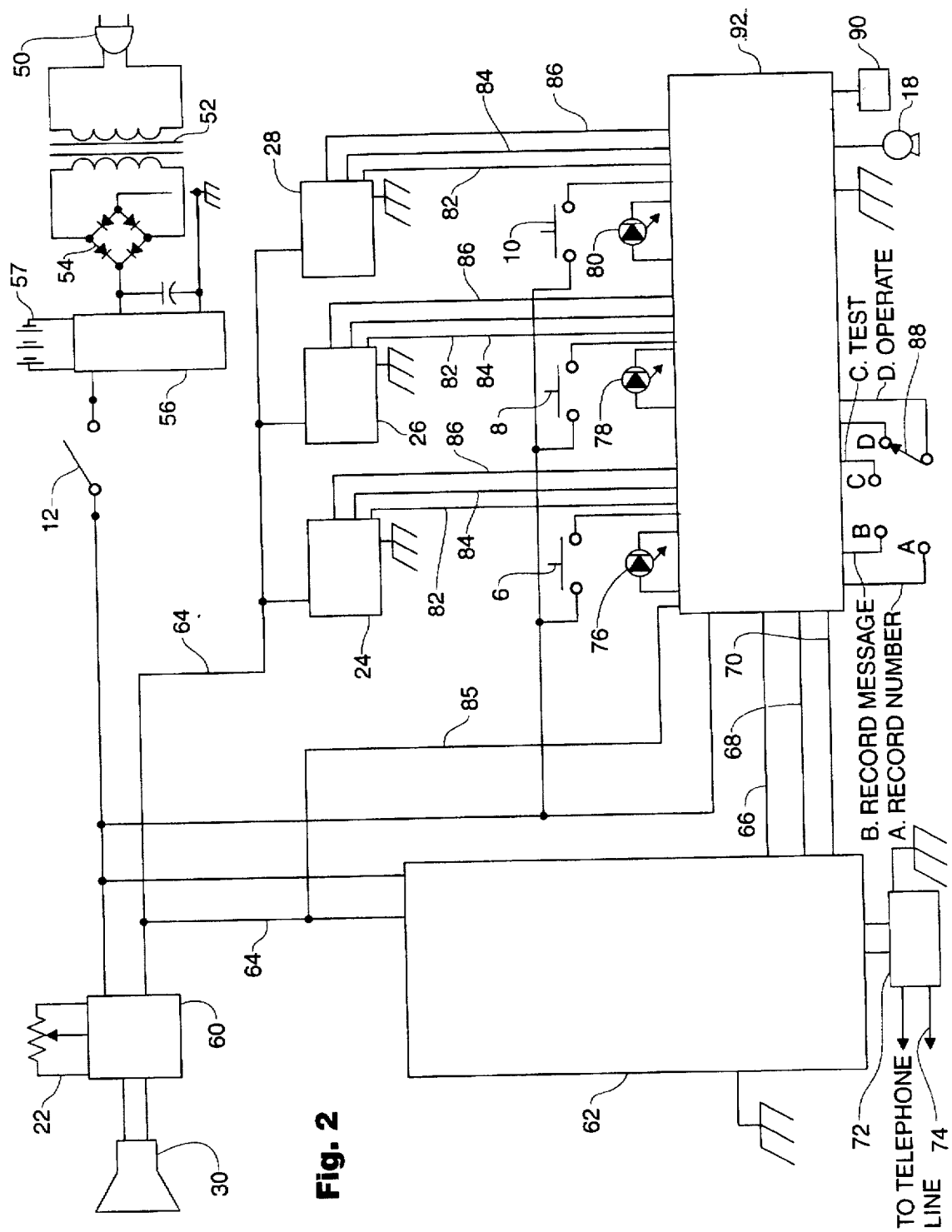
FIG. 2 is an electrical schematic diagram of the logic circuitry according to a preferred embodiment of the present invention.

Referring to FIG. 2, the first emergency activation means 6 is depicted schematically in its preferred embodiment as a push-button. Located in an unobstructed manner on the control panel surface 4 (as shown in FIG. 1) this push-button activates the first flashing light emitting diode 76, the first message recording/playback means and the recording/playback/monitoring control circuit 92.

Similarly, the second emergency activation means 8 is depicted schematically in its preferred embodiment as a push-button. Located in an unobstructed manner on the control panel surface 4 (as shown in FIG. 1) this push-button activates the second flashing light emitting diode 78, the second message recording/playback means 26, and the recording/playback/monitoring control circuit 92.

Also, the third emergency activation means 10 is depicted schematically in its preferred embodiment as a push-button. Located in an unobstructed manner on the control panel surface 4 (as shown in FIG. 1) this push-button activates the third flashing light emitting diode 80, the third message recording/playback means 28, and the recording/playback/monitoring control circuit 92.

The microphone 18 is used to record the emergency message onto the first message recording/playback means 24, the second message record/playback means 26, and the third message record/playback means 28 through the recording/playback/monitoring control circuit 92. The playback volume control means 22 allows the user to adjust the volume level that is heard through the speaker 30, and will also allow the present invention to operate in a silent mode in the case of Police request (i.e. silent-alarm). In addition, the microphone 18 can be used to transmit local sounds onto the phone lines to allow authorities to monitor or record the situation. The speaker 30 also allows the user to hear the recording message for testing purposes as well as during actual use.

According to the preferred embodiment of the present invention, the first message recording/playback means 24 comprises a complete micro-cassette mechanism containing the telephone number as well as the emergency message for the Police department. It is also envisioned as an alternative embodiment that the first message recording/playback means 24 could comprise a solid state unit with the same information recorded electronically on a integrated circuit.

According to the preferred embodiment of the present invention, the second message recording/playback means 26 comprises a complete micro-cassette mechanism containing the telephone number as well as the emergency message for the Fire department. It is also envisioned as an alternative embodiment that the second message recording/playback means 26 could comprise a solid state unit with the same information recorded electronically on a integrated circuit.

Also according to the preferred embodiment of the present invention, the third message recording/playback means 28 comprises a complete micro-cassette mechanism containing the telephone number as well as the emergency message for an Ambulance. It is also envisioned as an alternative embodiment that the third message recording/playback means 28 could comprise a solid state unit with the same information recorded electronically on a integrated circuit.

A power plug 50 is provided, to which alternating current power is to be applied. A power transformer 52 and rectifier circuit 54 convert alternating current to direct current. A battery charging/automatic switchover circuit 56 is also provided in the preferred embodiment of the present invention. The battery charging/automatic switchover circuit 56 circuit under normal conditions will supply a trickle charge to the battery 57. Upon loss of alternating current, the battery charging/automatic switchover circuit 56 will automatically switchover to battery power to allow the unit to continue to operate. The on/off control means 12 is in electrical series with the battery charging/automatic switchover circuit 56 in order to deactivate the emergency phone messaging system.

An amplifier 60 is provided to amplify the low-level signal from either the first message record/playback means 24, the second message record/playback means 26, or the third message record/playback means 28, into a level that will power the speaker 30.

A telephone control circuit 62 is provided to control all input and output functions concerning the phone line 74.

A telephone number/message audio line 64 provides a means for the telephone number that is to be dialed from either the first message record/playback means 24, the second message record/playback means 26, or the third message record/playback means 28, to be passed onto the phone system. In addition, after the phone on the receiving end has been answered, the telephone number/message audio line 64 provides a means to pass along the recorded message to the recipient, as well as play the message through the amplifier 60 and speaker 30. A monitoring audio line 85 passes monitored sounds from the microphone 18 to the telephone control circuit 62, which passes the sounds along the telephone line 74 to the recipient.

A call answer line 66 signals a recording/playback control circuit 92 that the phone on the receiving end has been answered and to begin to playback the recorded message. A message acknowledge and monitoring request line 68 signals the recording/playback control circuit 92 that the recipient of the recorded message has acknowledged the message and that unit may reset itself. The recipient of the message will acknowledge the message by pressing a predetermined number on his or her phone. If the message acknowledge signal is not received after a predetermined time interval the record/playback control circuit 92 will re-cycle and dial out again. This procedure will continue to repeat until the message acknowledge signal is received or the user resets the system manually. This will prevent the message from being delivered to "busy" numbers, unanswered numbers, answering machines, etc. The recipient of the message may also press a pre-determined key or series of keys to begin monitoring sounds through the microphone 18. The message acknowledge and monitoring request line 68 signals the recording/playback/monitoring control circuit 92 to initiate the monitoring function.

A dial tone request line 70 is provided and allows the recording/playback/monitoring control circuit 92 to access the telephone control circuit 62, under the condition that either the first emergency activation means 6, second emergency activation means 8, or third emergency activation means 10 has been engaged.

A telephone isolation coupler 72 couples the telephone control circuit 62 to the outside telephone line 74. An auxiliary phone jack 90 allows a standard Touch-Tone phone to be plugged into the unit for recording the emergency telephone numbers.

A series of rewind signal lines 82 are provided by the recording/playback/monitoring control circuit 92, and instructs either the first message recording/playback means 24, the second message record/playback means 26, and/or the third message record/playback means 28 to rewind. In an alternate embodiment envisioned which utilized solid state recording/playback means, the rewind signal lines 82 will merely reset the solid-state recording units.

A series of playback signal lines 84 are provided by the recording/playback/monitoring control circuit 92, and instructs either the first message recording/playback means 24, the second message record/playback means 26, and/or the third message record/playback means 28 to play.

A series of record signal lines 86 are provided by the recording/playback/monitoring control circuit 92, and instructs either the first message recording/playback means 24, the second message record/playback means 26, and/or the third message record/playback means 28 to record the telephone number or emergency message depending on the position of the test engagement means 14 and message selection means 16.

The test engagement means 14 and message selection means 16 are depicted schematically in an alternate preferred embodiment as an operating selector switch 88. The operating selector switch 88 allows the operator to select between four different operating modes as follows:

A. Record Telephone number. Records the emergency telephone number. This is done via the use of a standard touch-tone telephone which produces DTMF frequencies which is plugged into an auxiliary phone jack 90. This phone can be removed after numbers are programmed to prohibit tampering.

B. Record Emergency Message. Records the emergency message. The user would select this mode and press the appropriate emergency activation push-button for the corresponding emergency service and begin speaking into the microphone 18. After the message is complete, the user would then again hit the corresponding emergency activation push-button to stop recording.

C. Test message. Allows the user to re-play the emergency message from each of the recording/playback mechanisms. The user would select this mode and hit the emergency activation push-button for the unit he or she wishes to hear.

D. Operating position. In this mode the unit is ready to operate and call out to any emergency service and playback the emergency message from any of the three recording/playback mechanisms when the corresponding emergency initiating push-button is pressed.

And finally, the recording/playback/monitoring control circuit 92 is depicted schematically and accepts inputs from the telephone control circuit 62, the first emergency activation means 6, the second emergency activation means 8, the third emergency activation means 10. The recording/playback/monitoring control circuit 92 also sends outputs to the first message record/playback means 24, the second message record/playback means 26, the third message record/playback means 28 and/or the telephone control circuit 62. These outputs depend on the position of the operating selector switch 88.

The foregoing description of the preferred embodiment of the present invention has been presented for purposes of illustration and description. It is not intended to be exhaustive or to limit the present invention to the precise form disclosed, and obviously many modifications and variations are possible in light of the above teachings.

The preferred embodiment was chosen and described in order to best explain the principles of the present invention and its practical application to those persons skilled in the art, and thereby to enable those persons skilled in the art to best utilize the present invention in various embodiments and with various modifications as are suited to the particular use contemplated. It is intended that the scope of the present invention be broadly defined by the claims which follow.

What is claimed is:

1. An improved emergency phone messaging system for use with a standard, wire based phone system comprising:

a housing, said housing having at least one flat, accessible control panel surface;

plurality of recording and playback means for recording phone numbers and emergency voice messages, for storing said phone numbers and emergency voice messages, and for playing back said phone numbers and emergency voice messages;

a speaker in electrical communication with at least one said recording and playback means, for audibly testing and screening said emergency voice messages;

test engagement means for selectably testing said phone numbers and emergency voice messages;

a microphone in electrical communication with and for imparting said emergency voice messages into said recording and playback means;

control means for turning said emergency phone messaging system on or off;

a telephone connection port for connecting said recording and playback means to a standard touch-tone telephone;

plurality of emergency activation means, each for activating one said recording and playback means;

message selection means for selectably assigning said phone number and emergency voice message to individual said recording and playback means;

a recording/playback/monitoring control means for initiating said recording and playback means, for accepting phone number inputs, voice message inputs and controlling inputs, for playing back said phone numbers and messages, for requesting a dial tone, and for accepting a monitoring request from a message receiver, and interrupting playback of said emergency voice messages and initiating a monitoring function in response to such a monitoring request;

said recording/playback/monitoring means in communication with said recording and playback means, said speaker, said test engagement means, said microphone, said control means, said emergency activation means, said selection means, and a telephone control means; and a telephone control means for controlling input from said recording and playback means, from said recording/playback/control circuit and from a telephone line, and for controlling output to said recording/playback/control circuit and to a telephone line.

2. The improved emergency phone messaging system described in claim 1, wherein each said recording and playback means comprises a complete microcassette mechanism, wherein said phone numbers are recorded onto a microcassette tape as well as emergency voice messages, and wherein said phone numbers and emergency voice messages are selectably played back onto a telephone line upon initiation of said emergency activation means.

3. The improved emergency phone messaging system described in claim 1, wherein each said recording and playback means comprises a complete solid state electronic recording mechanism, wherein said phone numbers are recorded onto an integrated circuit as well as emergency voice messages, and wherein said phone numbers and emergency voice messages are selectably played back onto a telephone line upon initiation of said emergency activation means.

4. The improved emergency phone messaging system described in claim 1, wherein said recording and playback means comprises a complete microcassette mechanism, wherein said phone numbers are recorded onto a microcassette tape as well as emergency voice messages.

5. The improved emergency phone messaging system described in claim 1, wherein said recording and playback means comprises a complete solid state recording mechanism, wherein said phone numbers are recorded into said solid state recording mechanism as well as emergency voice messages.

6. The improved emergency phone messaging system described in claim 1, wherein said test engagement means and said message selection means are combined, and comprising an operating selector switch, said operating selector switch allowing a user to select between four different operating modes as follows:
A. Record Telephone Number Mode;
B. Record Emergency Message Mode;
C. Test Message Mode; and
D. Operating Mode.

7. The improved emergency phone messaging system described in claim 1, wherein said plurality of emergency activation means comprises:
a first initiation push-button, mounted accessibly on said control panel surface, said first initiation push-button activating one said recording and playback means, and said first initiation push-button embossed with the universal symbol for "police";
a first light emitting diode, said first light emitting diode being activated in a flashing manner upon both engagement of said first initiation push-button and achievement of an active connection by said telephone connection port;
a second initiation push-button, mounted accessibly on said control panel surface, said second initiation push-button activating one said recording and playback means, and said second initiation push-button embossed with the universal symbol for "fire";
a second light emitting diode, said second light emitting diode being activated in a flashing manner upon both engagement of said second initiation push-button and achievement of an active connection by said telephone connection port;
a third initiation push-button, mounted accessibly on said control panel surface, said third initiation push-button activating one said recording and playback means, and said third initiation push-button embossed with the universal symbol for "ambulance"; and
a third light emitting diode, said third light emitting diode being activated in a flashing manner upon both engagement of said third initiation push-button and achievement of an active connection by said telephone connection port.

8. An improved emergency phone messaging system for use with a standard phone system comprising:
a housing, said housing having at least one flat, accessible control panel surface;
a first recording/playback mechanism;
a second recording/playback mechanism;
a third recording/playback mechanism;
a first initiation push-button, said first initiation push-button mounted accessibly on said control panel surface; said first initiation push-button activating a first flashing light emitting diode, a first recording/playback mechanism, and a recording/playback control circuit;
a second initiation push-button, said second initiation push-button mounted accessibly on said control panel surface; said second initiation push-button activating a second flashing light emitting diode, a second recording/playback mechanism, and a recording/playback control circuit;
a third initiation push-button, said third initiation push-button mounted accessibly on said control panel surface; said third initiation push-button activating a third flashing light emitting diode, a third recording/playback mechanism, and a recording/playback control circuit;
an on/off switch to deactivate said phone messaging system;
a microphone for both recording an emergency message onto a plurality of recording/playback mechanisms and remotely monitoring sounds generated in the vicinity of said emergency phone messaging system;
volume control means to allow the user to adjust the volume level that is heard through a speaker;
a speaker, said speaker allowing the user to hear the recorded message for testing purposes or during actual use;
a power plug to which alternating current power is to be applied;
a power transformer in electrical communication with said power plug;
a rectifier circuit to convert alternating current to direct current in direct electrical communication with said power transformer;
a battery;
a battery charging/automatic switchover circuit supplying a trickle charge to the battery under normal conditions, and upon loss of alternating current, said battery charging/automatic switchover circuit for automatically switching over to battery power, allowing said emergency phone messaging system to continue to operate;
an amplifier for amplifying the low-level signal from each of the three said recording/playback mechanisms into a level that will power said speaker;
a telephone control circuit, said telephone control circuit controlling all input and output functions concerning the phone line;
a telephone number/message audio line, said telephone number/message audio line for providing a means for the telephone number that is to be dialed from each of the three said record/playback mechanisms to be passed onto the phone system and, in addition, for passing along a recorded message to the recipient after the phone on the receiving end has been answered;
a call answer line, said call answer line signaling a recording playback control circuit with information that the phone on the receiving end has been answered and to begin to playback the recorded message;
a message acknowledge line for signaling any said recording/playback mechanism that the recipient of the recorded message has acknowledged said message;

a dial tone request line for allowing a recording/playback control circuit to access a telephone control circuit;

a telephone isolation coupler for coupling said telephone control circuit to an outside telephone line;

a rewind signal line for instructing each said recording/ playback mechanisms to reset;

a playback signal line for instructing each said recording/ playback mechanisms to playback any stored telephone number or emergency messages;

an operating selector switch for allowing an operator to select between four different operating modes as follows:

A. Record Telephone number;
B. Record Emergency Message;
C. Test Message;
D. Operating position;

an auxiliary phone jack for attachment to a standard Touch-Tone phone; and a recording/playback control circuit, said recording/ playback control circuit for accepting inputs from said telephone control circuitry and said initiation pushbuttons and for sending outputs to each said recording/ playback mechanisms and/or said telephone control circuitry, depending on the position of said operating selector switch, and for instructing each recording/ playback mechanisms to record the telephone number or the emergency message depending on the position of said operating selector switch; and a monitoring control means for accepting a monitoring request from a message receiver and interrupting playback of the recorded message and initiating a monitoring function in response to such a monitoring request.

9. The improved emergency phone messaging system described in claim 8, wherein said first recording/playback mechanism, said second recording/playback mechanism, and said third recording/playback mechanism each comprise a complete microcassette mechanism, wherein said phone numbers are recorded onto a microcassette tape as well as emergency voice messages.

10. The improved emergency phone messaging system described in claim 8, wherein said first recording/playback mechanism, said second recording/playback mechanism, and said third recording/playback mechanism each comprise a complete solid state electronic recording mechanism, wherein said phone numbers are recorded onto an integrated circuit as well as emergency voice messages.

\* \* \* \* \*